US 9,096,206 B2

(12) United States Patent
Linkenbach et al.

(10) Patent No.: US 9,096,206 B2
(45) Date of Patent: Aug. 4, 2015

(54) BRAKE SYSTEM FOR MOTOR VEHICLES

(75) Inventors: Steffen Linkenbach, Eschborn (DE); Stefan Drumm, Saulheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 13/818,143

(22) PCT Filed: Aug. 25, 2011

(86) PCT No.: PCT/EP2011/064595
§ 371 (c)(1),
(2), (4) Date: Feb. 21, 2013

(87) PCT Pub. No.: WO2012/028521
PCT Pub. Date: Mar. 8, 2012

(65) Prior Publication Data
US 2013/0147259 A1    Jun. 13, 2013

(30) Foreign Application Priority Data

Aug. 30, 2010  (DE) .......................... 10 2010 039 931
Aug. 24, 2011  (DE) .......................... 10 2011 081 461

(51) Int. Cl.
*B60T 13/66* (2006.01)
*B60T 13/74* (2006.01)
(Continued)

(52) U.S. Cl.
CPC ............... *B60T 13/745* (2013.01); *B60T 7/042* (2013.01); *B60T 7/06* (2013.01); *B60T 8/4081* (2013.01); *B60T 8/441* (2013.01); *B60T 11/20* (2013.01); *B60T 13/662* (2013.01); *B60T 13/686* (2013.01); *B60T 17/18* (2013.01); *B60T 2270/402* (2013.01); *B60T 2270/82* (2013.01)

(58) Field of Classification Search
USPC .......... 303/10, 11, 114.1, 115.4, 115.5, 116.1, 303/116.2, 115.2
See application file for complete search history.

(56) References Cited

U.S. PATENT DOCUMENTS 4,750,788 A * 6/1988 Seibert et al. ............... 303/113.2
4,793,663 A * 12/1988 Ocvirk et al. ............... 303/116.1
(Continued)

FOREIGN PATENT DOCUMENTS

DE    36 36 442 A1    5/1988
DE    103 30 146 A1   1/2005
(Continued)

OTHER PUBLICATIONS

PCT International Search Report—Jan. 24, 2012.
(Continued)

*Primary Examiner* — Christopher Schwartz
(74) *Attorney, Agent, or Firm* — Brinks Gilson & Lione

(57) ABSTRACT

A brake system for motor vehicles comprising a brake master cylinder which can be activated by means of a brake pedal and to which wheel brakes are connected. The brake system also comprises an electrically controllable pressure-generating device, a pressure-regulating valve arrangement to regulate a wheel brake pressure set at a wheel brake, a first electronic control and regulating unit which controls at least one of the pressure-generating device, the pressure-regulating valve arrangement, and an electrically controllable auxiliary pressure-generating device by means of which the brake master cylinder can be activated by means of which a pressure in an intermediate chamber of the brake master cylinder can be controlled or regulated.

14 Claims, 1 Drawing Sheet

(51) Int. Cl.
   *B60T 7/04*    (2006.01)
   *B60T 8/40*    (2006.01)
   *B60T 8/44*    (2006.01)
   *B60T 11/20*   (2006.01)
   *B60T 13/68*   (2006.01)
   *B60T 17/18*   (2006.01)
   *B60T 7/06*    (2006.01)

(56) References Cited

U.S. PATENT DOCUMENTS

| | | | |
|---|---|---|---|
| 4,804,236 A * | 2/1989 | Burgdorf et al. | 303/116.1 |
| 5,013,094 A * | 5/1991 | Nishii et al. | 303/52 |
| 5,401,084 A * | 3/1995 | Volz | 303/113.2 |
| 6,412,882 B1 * | 7/2002 | Isono et al. | 303/114.1 |
| 7,309,112 B2 * | 12/2007 | Isono | 303/11 |
| 7,661,769 B2 * | 2/2010 | Kajita et al. | 303/114.1 |
| 2007/0024110 A1 * | 2/2007 | Isono | 303/114.3 |
| 2008/0258545 A1 * | 10/2008 | Drumm | 303/114.1 |
| 2010/0225159 A1 * | 9/2010 | Drumm | 303/20 |

FOREIGN PATENT DOCUMENTS

| | | |
|---|---|---|
| DE | 10 2005 036 638 A1 | 4/2006 |
| DE | 10 2010 003 081 A1 | 8/2011 |
| GB | 2 443 921 | 5/2008 |
| WO | WO 02/42138 A1 | 5/2002 |
| WO | WO 2008/025797 * | 3/2008 |
| WO | WO 2009/065884 A1 | 5/2009 |

OTHER PUBLICATIONS

German Examination Report—Mar. 15, 2012.

* cited by examiner

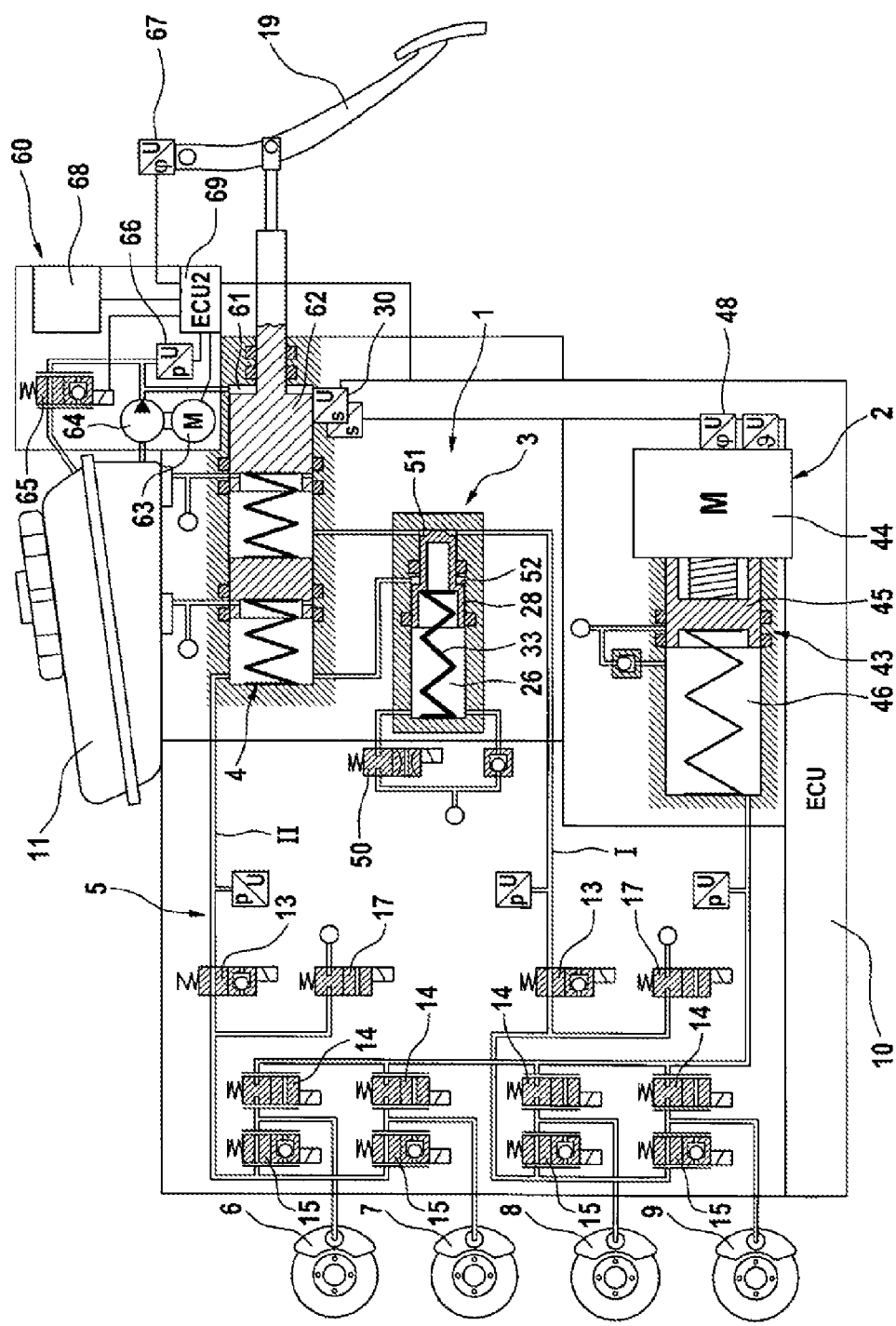

BRAKE SYSTEM FOR MOTOR VEHICLES

CROSS-REFERENCE TO RELATED APPLICATIONS

This application claims priority to German Patent Application Numbers 10 2010 039 931.0, filed Aug. 30, 2010, 10 2011 081 461.2, filed Aug. 24, 2011, and PCT/EP2011/064595, filed Aug. 25, 2011.

FIELD OF THE INVENTION

The invention concerns a brake system for motor vehicles with a brake master cylinder which can be activated by means of a brake pedal and to which wheel brakes are connected, an electrically controllable pressure-generating device. The system further having a pressure-regulating valve arrangement to regulate and/or control a wheel brake pressure set at a wheel brake, and a first electronic control and regulating unit which controls or regulates the pressure-generating device and/or the pressure-regulating valve arrangement.

BACKGROUND AND INTRODUCTORY DESCRIPTION OF THE INVENTION

In automotive technology, "brake by wire" brake systems are becoming increasingly common. Such brake systems often comprise a pedal-decoupling unit which is connected upstream of a brake master cylinder, whereby a brake pedal activation by the driver in "brake by wire" operating mode causes a separation of the direct hydraulic connection of the brake master cylinder with the wheel brakes and switches the hydraulic pressure output by the brake pressure-generating device to the wheel brakes. A segment of the action chain from detection of the driver's request to the build-up of a corresponding brake system pressure in the pressure-generating device is "by wire" and consequently not hydraulic. In "by wire" operating mode, the electrically controllable pressure-generating device applies brake pressure to the wheel brakes. To give the driver an acceptable pedal feel in "brake by wire" operating mode, "by wire" brake systems normally comprise a brake pedal feel simulation device. In these brake systems, the brakes can also be activated on the basis of electronic signals without the active involvement of the vehicle driver. These electronic signals can for example be emitted by an electronic stability program ("ESP") or an automatic cruise control system ("ACC").

If the "by wire" function is not ready for operation—for example due to possible failure of the electrically controllable pressure-generating device—the brake system switches to a fall-back mode which restores the conventional direct hydraulic coupling of the chambers of the tandem brake master cylinder with the wheel brakes. Thus a vehicle equipped with such a "by wire" brake system can also be braked on failure of the pressure-generating device, on failure of the electronic unit and even on failure of the electrical power supply, but then only with the setting energy provided by the driver on activation of the brake pedal.

The present invention is based on the object of fitting the fall-back operating mode of a "by wire" vehicle brake system with a brake force support which is independent of the function of the pressure-generating device.

This object is achieved according to the invention by a brake system according to this invention, wherein this comprises an electrically controllable auxiliary pressure-generating device by means of which the brake master cylinder can be activated, in particular by means of which a pressure in an intermediate chamber of the brake master cylinder can be controlled or regulated.

Further preferred embodiments or advantageous embodiments of the invention arise from the description below with reference to a FIGURE.

The invention is based on the consideration that an electro-hydraulic brake system which has a normal "brake by wire" operating mode and a hydraulic fall-back level must generate sufficient braking force in any operating state. This should be the case in particular when the control and regulating unit for controlling the pressure-generating device, or the pressure-generating device itself, has a malfunction or fails completely.

As is now known, this object can be achieved in that an independent auxiliary pressure-generating device is provided, by means of which the brake master cylinder can be externally activated to a certain extent. For this, the auxiliary pressure-generating device is connected hydraulically with an intermediate chamber of the brake master cylinder such that, on movement of a pressure medium into this intermediate chamber, a piston in the brake master cylinder is activated by the auxiliary pressure-generating device and hence pressure is built up in the chambers of the brake master cylinder and/or brake fluid can be displaced therefrom into the brake circuits.

The brake system in a so-called "brake by wire" operating mode can preferably be controlled both by the vehicle driver and independently of the vehicle driver; preferably it is operated in "brake by wire" mode and can be operated in at least one fall-back mode in which operation only by the vehicle driver is possible.

According to a first preferred embodiment example, the brake system for motor vehicles comprises a brake master cylinder which can be activated by means of a brake pedal, a wheel-brake-pressure modulation device to which the wheel brakes are connected, an electrically controllable pressure-generating device (preferably a cylinder-piston arrangement, the piston of which can be activated by an electromechanical actuator), a pressure-regulating valve arrangement to regulate and/or control a wheel brake pressure set at a wheel brake, and an electronic control and regulating unit (electronic unit ECU) which serves to control or regulate the brake system in a normal brake function without amplification by a servo (auxiliary pressure-generating device).

The pressure-regulating valve arrangement is preferably connected hydraulically to the brake master cylinder, the pressure-generating device and wheel brakes. By means of the pressure-regulating valve arrangement, the wheel brakes can be supplied with system brake pressure either by the brake master cylinder or by the pressure-generating device. The pressure-generating device activates the wheel brakes preferably directly via the pressure-regulating valve arrangement, e.g. the pressure chamber of the pressure-generating device can be connected with each of the wheel brakes via at least one valve.

Furthermore, the brake system according to the invention comprises an electrically controllable auxiliary pressure-generating device (an electro-hydraulic servo). This servo is preferably designed as an independent and also optional module of the brake system used in heavy vehicles, which could not achieve adequate braking effect without brake force amplification. In lighter vehicles and in vehicles with particularly efficient wheel brakes, this optional module can be omitted, whereby no substantial constructional changes are required to the remaining brake system (basic construction). This allows simplification of factory production of a brake system which is the same in principle for different vehicle types. This saves development and production costs.

According to the example, the servo or auxiliary pressure-generating device comprises an electric motor, a pump, a pressure sensor, a pedal travel or pedal angle sensor, an electrical energy accumulator, and a second electronic control and regulating unit or electronic unit. The servo preferably supplies an electronically regulated servo pressure which is passed via a hydraulic connection to an amplification-active surface in the master cylinder and there activates the master cylinder.

The second control and regulating unit or electronic unit of the servo (ECU2) is advantageously connected via a communication connection with the first control and regulating unit or electronic unit for normal function. The servo function is activated when necessary—for example when the first electronic unit for normal function is inactive and therefore does not respond to communication requests. The pedal position is determined and converted into a nominal servo pressure following a predetermined curve. This nominal pressure is then set by the second electronic unit of the servo by means of the electric motor, pump and pressure sensor.

Advantageously, the auxiliary pressure-generating device activates the brake master cylinder to set a nominal pressure, in particular a nominal pressure in the intermediate chamber of the brake master cylinder, when the first control and regulating unit and/or the pressure-generating device is partly or fully inactive or non-functioning. This means that the servo is used only when the regular pressure build-up by means of the pressure-generating device is not possible because of malfunctions and/or control faults. This ensures that sufficient brake pressure can be built up in the wheel brakes even on such a component failure. Such a situation can be detected via correspondingly selected signals over a communication connection described above between the first and second control and regulating unit.

Advantageously, the first electronic control and regulating unit is connected with a first sensor which determines the brake pedal travel or brake pedal angle or a value corresponding thereto, and the auxiliary brake pressure-generating device is connected with or comprises a second, in particular independently constructed sensor, in particular a brake pedal travel or brake pedal angle sensor, which determines the brake pedal travel or brake pedal angle or a value corresponding thereto.

The servo thus to a certain extent preferably comprises a pedal travel or pedal angle sensor to detect the pedal activation. A force sensor which detects the brake-pedal-actuating force would be too costly as a signal emitter for the servo, in particular in view of the modular design of the auxiliary brake pressure-generating device. By using a simple design of servo with no force sensor, the availability of the brake force support is extended to operating states in which the normal function of the brake system is not available.

Advantageously, using signals from the second sensor in the second electronic control and regulating unit of the auxiliary pressure-generating device, a nominal pressure is determined to activate the brake master cylinder. Signals from the first sensor are not required in this case. This embodiment supports a modular design of the auxiliary pressure-generating device.

In a normal "brake by wire" operating mode, a brake system pressure is generated preferably by the pressure-generating device. The pressure-generating device is advantageously formed by a cylinder-piston arrangement, the piston of which can be activated by an electromechanical actuator.

In a preferred embodiment of the brake system, connected to the brake master cylinder is a hydraulically activatable simulation device with at least one elastic element which, in particular in the "brake by wire" operating mode, gives the vehicle driver an acceptable pedal feel. In this operating mode the vehicle driver, on activation of the brake pedal, displaces pressure medium in the simulation device or simulator, wherein the pedal travel and/or pedal angle is determined and forms the basis for determination of the nominal braking moment. In this way, a reproducible relationship can be achieved between the pedal travel and a nominal value of the brake system pressure.

The advantages of the invention lie in particular in that with the auxiliary brake pressure-generating device, a measure for providing the brake system pressure independently of the pressure-generating device active in normal mode is achieved. In particular in a fall-back level, in this way the driver can be supported when braking the vehicle. With a modular design, the auxiliary pressure-generating device can be used in heavy vehicles in which an additional brake pressure build-up is required in order to fulfill legal requirements. In lighter vehicles this may be omitted. The other components of the brake system can then be used for both types of vehicle without adaptation. If a pedal travel or pedal angle sensor is used instead of a costly force sensor, the modular construction can be implemented systematically.

BRIEF DESCRIPTION OF THE DRAWINGS

A preferred embodiment example of the invention is explained in more detail in drawing FIG. 1 which shows diagrammatically an advantageous embodiment example of a brake system according to the invention with a wheel-brake-pressure modulation unit, a pressure-generating device and an auxiliary pressure-generating device.

DETAILED DESCRIPTION OF THE INVENTION

The embodiment example of a brake system according to the invention as shown in FIG. 1 and is described in more detail below. The electro-hydraulic brake system shown as an example in the FIGURE substantially comprises an actuator device 1 with a tandem brake master cylinder 4 and a simulation device 3, an electrically controllable pressure-generating device 2, a wheel brake pressure modulation device or pressure-regulating valve arrangement 5, and an electronic control and regulating unit (ECU) 10. Wheel brakes 6, 7, 8, 9 are connected to the wheel-brake-pressure modulation device 5. The pressure chambers of the brake master cylinder 4 can be connected with a pressure medium storage reservoir 11 under atmospheric pressure. The wheel brakes 6, 7, 8, 9 are allocated to the brake circuits I, II such that the wheel brakes 8, 9 connected to the first brake circuit I are allocated to one vehicle axle while the wheel brakes 6, 7 connected to the second brake circuit II serve to brake the other vehicle axle.

Wheel speed sensors (not shown) for example can serve for indirect detection of the pressure set in wheel brakes 6 to 9 on a braking process. The brake master cylinder 4 can be activated via a brake pedal 19. The activation travel of the brake pedal 19 is determined by means of a travel sensor 30, preferably designed redundant, which e.g. senses the travel of a piston and hence serves to detect the driver's request or generate a nominal value in the electronic control and regulating unit 10.

The electro-hydraulic pressure-generating device 2 substantially comprises for example a hydraulic cylinder-piston arrangement 43 and an electromechanical actuator 44 which for example is formed by an electric motor with a translation gear which converts a rotational movement of the electric motor into a translational movement of a hydraulic piston 45, so that a hydraulic pressure is built up in a pressure chamber 46 of the hydraulic cylinder-piston arrangement 43. The electromechanical actuator 44 is supplied with energy from an electrical onboard network (not shown) of the vehicle, where applicable buffered by an electrical energy accumulator (not shown). The movement of the piston 45 is detected indirectly by means of at least one rotary angle sensor 48 which senses the rotor position of the electromechanical actuator 44.

The wheel-brake-pressure modulation device or pressure-regulating valve arrangement 5 is hydraulically connected for example to the brake master cylinder 4, the pressure-generating device 2 and the wheel brakes 6, 7, 8, 9. It serves to regulate and/or control a wheel brake pressure set at each wheel brake 6, 7, 8, 9. Thus the wheel brakes can be pressurized either by the brake master cylinder 4 or by the pressure-generating device 2.

The pressure chamber 46 of the cylinder-piston arrangement 43 according to the example can be connected to the wheel brakes via the normally closed seat valves 14 allocated to the wheel brakes.

In normal operation of the brake system ("brake by wire" operating mode), the cylinder-piston arrangement 43 and actuator 44 builds up the brake system pressure, from which the wheel-brake-pressure modulator or pressure-regulating valve arrangement 5 generates brake pressures individually for each wheel.

According to the example, a wheel brake pressure is built up in normal operation via a similar normally closed seat valve 14, and a wheel brake pressure is reduced via a similar normally open seat valve 15 (the output of which for example can be connected with the pressure medium storage reservoir 11 via a normally closed valve 17 for each brake circuit). The seat valves 14 and 15 in this example are oriented such that the valve lifter of the seat valve 14 acting as a pressure build-up valve is loaded by the actuator pressure in the direction of lifting away from the valve seat and by the wheel brake pressure in the direction of pressing onto the valve seat, and such that the seat valve 15 acting as the pressure reduction valve is loaded by the wheel brake pressure in the direction of lifting away from the valve seat.

The pressure chambers of the brake master cylinder 4 are or can be each connected with the normally open pressure reduction valves or seat valves 15 of wheel brakes 6 to 9 via a normally open isolating valve 13, which for example in powered state fulfills the function of a non-return valve.

In a fall-back mode, the two chambers of the tandem master cylinder 4 (via the isolating valves 13 now open) and further normally open valves 15 of the modulator are hydraulically connected directly (in other possible variants of the brake system, the further normally open valves of the modulator are brake pressure build-up valves and for example also designed digitally). To change to fall-back mode in the brake system according to the example, the power to the valves and actuator is switched off.

The modulator or pressure-regulating valve arrangement 5 is switched from fall-back mode to normal mode in the example shown by powering up the four switchable valves 13 and 17. Thus the connection of the seat valves 15 acting as brake-pressure reduction valves with the brake master cylinder 4 is interrupted and these valves 15 are connected on the output side with the pressure medium storage reservoir 11.

In normal operating mode of the brake system ("brake by wire" operating mode), the brake master cylinder 4 is decoupled from the wheel brakes by the valves 13 and pressure medium is displaced by the vehicle driver from the two pressure chambers of the brake master cylinder 4 into the simulation device 3, which gives the vehicle driver an acceptable pedal feel. The brake pressure at the wheel brakes is generated by the pressure-generating device 2.

In an emergency operating mode, also called fall-back mode (all valves of the modulator except the valve in the servo according to the invention are in non-powered state), the wheel brakes are connected with the brake master cylinder 4 via valves 15 and 13, and the brake pressure is generated e.g. by the vehicle driver.

The simulation device 3 constitutes a hydraulically activated pedal feel simulator. The simulation device 3 comprises for example an elastic element 33 (e.g. a simulator spring) and a piston 28 which constitutes a delimitation of a hydraulic chamber 26. The hydraulic chamber 26 is connected with the pressure medium storage reservoir 11 via a normally open valve 50. The piston 28 on the side facing away from the simulator spring 33 has two hydraulically active surfaces 51 and 52 which can each be subjected to the pressure of a hydraulic circuit I, II of the (tandem) brake master cylinder 4.

The simulation device 3 comprises, according to the example, two hydraulically active surfaces 51 and 52, the movement of which is coupled together, in particular rigidly, wherein each of the active surfaces 51 and 52 can be subjected to the pressure of one of the brake circuits I, II of the brake master cylinder 4.

The simulation device 3 is for example designed to be switchable on and off, in particular a hydraulic chamber 26 of the simulation device 3 can be connected to or separated from the pressure medium storage reservoir 11 under atmospheric pressure by means of an electrically controllable simulator release valve 50.

In normal operation of the brake system, the hydraulic connection of the (tandem) brake master cylinder 4 to the wheel brakes is blocked while the simulator is released. In a fall-back operating mode, the (tandem) brake master cylinder 4 is connected with the wheel brakes and the simulator is blocked.

Furthermore, the brake system comprises an electrically controllable auxiliary pressure-generating device 60 (electrohydraulic servo), by means of which the brake master cylinder 4 can be activated. According to the example, an intermediate chamber 61 of the brake master cylinder 4 can be pressurized by the auxiliary pressure-generating device 60, which leads to activation of a piston 62 of the brake master cylinder 4. The auxiliary pressure-generating device 60 (servo) thus acts as a brake force amplifier which is connected upstream of the brake master cylinder 4 and additively overlays an amplification force over the actuating force initiated via the brake pedal 19.

According to the example, the auxiliary brake pressure-generating device 60 comprises an electric motor 63, a pump 64, a back-pressure-regulating valve 65, a pressure sensor 66, a pedal travel or pedal angle sensor 67, an electrical energy accumulator 68, and an electronic unit 69 (ECU2). The auxiliary pressure-generating device 60 supplies an electronically regulated servo pressure which, via a hydraulic connection, is guided into the intermediate chamber 61 of the brake master cylinder 4 and thus activates the brake master cylinder 4. The auxiliary pressure-generating device 60 is therefore largely designed autonomous, in particular with regard to energy supply and sensors.

The electronic unit 69 is connected with the control and regulating unit 10 according to the example via a communication connection. The servo function is activated when necessary, e.g. on a fault of the control and regulating unit 10.

Here the pedal position is determined by means of sensor 67 and converted into a nominal servo pressure according to a predetermined curve. This nominal pressure is set by the electronic unit 69 using electric motor 63, pump 64, and pressure sensor 66.

The brake system according to the invention can be used for brake circuits divided both by axle and diagonally.

Embodiment examples of the wheel-brake-pressure modulation device or brake regulating valve arrangement 5 or simulation device 3 are conceivable which differ from the embodiment example shown in the FIGURE.

While the above description constitutes the preferred embodiment of the present invention, it will be appreciated that the invention is susceptible to modification, variation and change without departing from the proper scope and fair meaning of the accompanying claims.

The invention claimed is:

1. A brake system for motor vehicles comprising a brake master cylinder which can be activated by means of a brake pedal and to which wheel brakes are connected, an electrically controllable first pressure-generating device, a pressure-regulating valve arrangement to regulate a wheel brake pressure set at the wheel brakes, a first electronic control and regulating unit which controls at least one of the first pressure-generating device and the pressure-regulating valve arrangement, an electrically controllable second pressure-generating device activating the brake master cylinder by means of which a servo pressure supplied to an intermediate chamber of the brake master cylinder is controlled or regulated;

wherein in a normal brake by wire operating mode, a brake system pressure for activating the wheel brakes is generated by the first pressure-generating device and the brake master cylinder is isolated from the wheel brakes.

2. The brake system as claimed in claim 1, further comprising in that the second pressure-generating device is an independent module of the brake system.

3. The brake system as claimed in claim 1 further comprising an electric motor, a pump, a pressure sensor, a brake pedal travel or a brake pedal angle sensor, and an electrical energy accumulator, each associated with the second pressure generating device.

4. The brake system as claimed in claim 3, further comprising a second electronic control and regulating unit connected via a communication connection with the first electronic control and regulating unit.

5. The brake system as claimed in claim 1 wherein the second pressure-generating device activates the brake master cylinder to set the servo pressure at a nominal pressure supplied to the intermediate chamber and the brake master cylinder supplies brake pressure to the wheel brakes when the first electronic control and regulating unit or the first pressure-generating device is partly or fully inactive or non-functioning.

6. The brake system as claimed in claim 1 wherein the first electronic control and regulating unit is connected with a first sensor which determines a brake pedal travel or a brake pedal angle, and the second brake pressure-generating device is connected with a second sensor, which determines the brake pedal travel or the brake pedal angle.

7. The brake system according claim 6, wherein, using signals from the second sensor, a second electronic control and regulating unit determines the servo pressure of the brake master cylinder.

8. The brake system as claimed in claim 1 wherein the first pressure-generating device is formed by a cylinder-piston arrangement having a piston activated by an electromechanical actuator.

9. The brake system as claimed in claim 1 wherein, connected to the brake master cylinder is a hydraulically activated simulation device with at least one elastic element which, in a normal brake by wire operating mode, gives the vehicle driver pedal feel, and in the normal operating mode the brake master cylinder is isolated from supplying brake pressure to the wheel brakes.

10. The brake system as claimed in claim 1 wherein the second pressure-generating device comprises a second electronic control and regulating unit.

11. A brake system for motor vehicles comprising a brake master cylinder which can be activated by means of a brake pedal and to which wheel brakes are connected, an electrically controllable first pressure-generating device, a pressure-regulating valve arrangement to regulate a wheel brake pressure set at the wheel brakes, a first electronic control and regulating unit which controls at least one of the first pressure-generating device and the pressure-regulating valve arrangement, an electrically controllable second pressure-generating device activating the brake master cylinder by means of which a servo pressure supplied to an intermediate chamber of the brake master cylinder is controlled or regulated, and a second electronic control and regulating unit which controls the second pressure-generating device independent of the first pressure-generating device;

wherein in a normal brake by wire operating mode, a brake system pressure for activating the wheel brakes is generated by the first pressure-generating device and the brake master cylinder is isolated from the wheel brakes.

12. The brake system as claimed in claim 11, wherein the system further comprises a brake pedal travel or brake pedal angle sensor connected to the second pressure generating device, the sensor determining the brake pedal travel or brake pedal angle or a value corresponding thereto.

13. The brake system as claimed in claim 12, wherein the sensor is separate from a further sensor that is connected with the first electronic control and regulating unit, wherein the further sensor determines brake pedal travel or brake pedal angle or a value corresponding thereto.

14. The brake system as claimed in claim 11, further comprising a pressure sensor for determining the pressure of the second pressure generating device.

* * * * *